United States Patent Office 3,092,447
Patented June 4, 1963

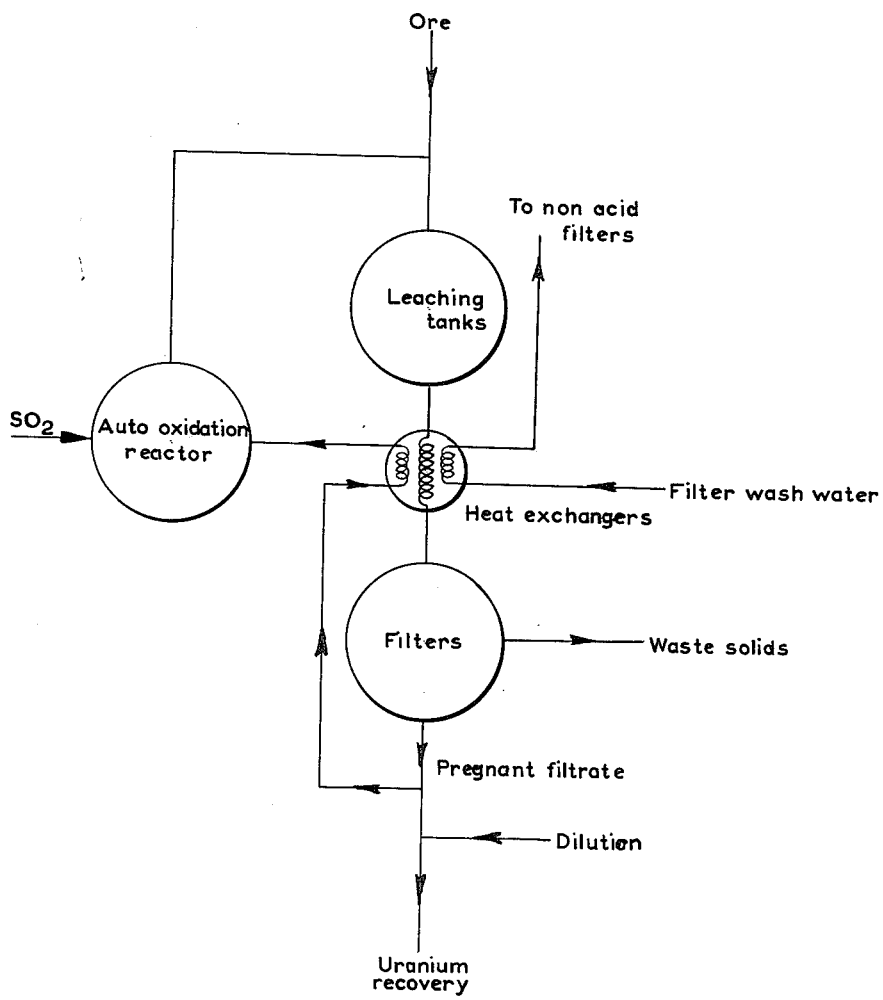

3,092,447
TREATMENT OF URANIUM ORES FOR RECOVERY OF THE URANIUM CONTENT THEREOF
Denis Ivor Legge and Maxwell Lipworth, Johannesburg, Transvaal, Republic of South Africa, assignors to Anglo-Transvaal Consolidated Investment Company Limited, Johannesburg, Transvaal, Republic of South Africa
Filed Aug. 3, 1959, Ser. No. 831,321
2 Claims. (Cl. 23—14.5)

This invention relates to the extraction of uranium from uranium bearing ores, the uranium being first dissolved from the ore by the use of sulphuric acid containing an oxidising agent which converts the insoluble lower oxides of uranium into the soluble uranyl form, and the uranium thereafter being removed from the acid solution, after filtration, by ion exchange or other means.

The oxidising agent used in the dissolution stage of the process is normally manganese dioxide and applicants have also used ferric sulphate for the same purpose. In the latter case, the ferric sulphate is produced by dissolving ferric hydroxide precipitated from uranium plant barren solution in sulphuric acid. This method of producing ferric sulphate is expensive and wasteful in that sulphuric acid and iron sulphates in the barren solution have to be neutralised with lime to precipitate the ferric or ferrous hydroxides. The ferrous hydroxide has then to be oxidised to ferric hydroxide by aeration and has thereafter to be filtered off and redissolved in fresh sulphuric acid.

It is an object of this invention to provide a less expensive and wasteful method of producing ferric sulphate for use as an oxidant and also to provide means whereby the ferric sulphate leach may be most effectively used.

In accordance with this invention there is provided a method for treatment of uranium ores comprising the continuous dissolution of the uranium from the ore by leaching the latter with sulphuric acid containing ferric sulphate, filtering the pulp, dividing the resulting filtrate into two streams, oxidizing the ferrous sulphate in the one stream to form ferric sulphate, thereafter recirculating this stream to the incoming ore and utilizing it for leaching said ore, diluting the other stream if necessary and thereafter extracting the uranium therefrom.

According to a further feature of the invention, the ferrous sulphate content of the recirculated stream is oxidised and the sulphuric acid content of said stream simultaneously increased by stirring said stream in a reaction vessel at a sufficient rate to form a vortex and flowing oxygen and sulphur dioxide through said vortex.

As an example of the application of this invention to the basic process of uranium dissolution, filtration of the pulp and extraction of uranium from the filtrate, may be carried out in the manner normally practised except that ferric sulphate is added to the leach liquor as the oxidant. Furthermore, a portion of the filtrate or pregnant solution is recirculated and added to the incoming ore stream. The proportion of recirculated filtrate solution may be from 35–65 percent and, during recirculation, it is subjected to a process of auto-oxidation whereby essentially the whole of its ferrous sulphate content is oxidised to ferric sulphate with any desired amount of sulphuric acid being made at the same time.

The auto-oxidation is preferably carried out in a stirred reactor in which the action of a stirrer causes formation of a vortex through which sulphur dioxide and air are fed as more fuly described in copending patent application Serial No. 831,394.

The uranium in the balance of the filtrate is extracted by ion exchange or other suitable means.

It is found and is a further feature of this invention that the advantage of a ferric sulphate leach as compared to a standard manganese dioxide leach is only fully obtained at temperatures over 50° C., and preferably in the range of 60° to 75° C., although temperatures up to 90° C. have been used. The presence of high concentrations of sulphuric acid and ferric iron is also necessary, for example, a residual sulphuric acid content of approximately 10–15 grams per litre and ferric iron of about 3–6 grams per litre, and with a leaching time of not more than 2 to 8 hours. It is not possible economically to treat a filtrate containing such high concentrations of acid and ferric iron by the normal processes of ion exchange or solvent extraction. However, the recirculation of portion of the filtrate as above described enables the high concentrations of sulphuric acid and ferric iron to be maintained during the actual leach, and the balance of the solution which is not recirculated to be diluted by an equal or other suitable amount of water or other solution, thereby reducing the sulphuric acid and ferric iron concentrations to values at which the uranium can be recovered in standard process equipment.

An additional feature of this process is that the temperature of the leached pulp must be reduced to approximately 40° C. before filtration on vacuum filters becomes practicable. This is done by heat exchange between the cooled re-cycled filtrate and hot pulp, whereby the filtrate is heated to the correct temperature for the conversion of its ferrous content into ferric iron, and heat exchange between cold water and hot pulp whereby the pulp is cooled down to suitable filtering temperature and the water which is then used for filter wash is heated to 35 to 60° C. This gives a more effective wash, thus reducing losses of dissolved uranium when used as wash on the acid filters. An additional benefit is derived by using this heated wash water on the non-acid filters as a portion of the sensible heat of the wash water is imparted to the incoming ore.

The above described process is illustrated in the accompanying flow sheet which will be self explanatory.

As an example of a commercial process operating according to the flow sheet, 4000 tons per day of ore, milled to 70% minus 200 mesh and which has already undergone previous treatment for the recovery of gold by cyanidation, is filtered to 22% moisture content and repulped with 1500 tons of reoxidised solution containing 19.6 tons of ferric iron to give a pulp containing 60% solids and 40% of solution.

This is supplemented with 4.4 tons of ferric iron precipitated as ferric hydroxide from the barren solution resulting after substantial removal of the uranium content from the filtrate.

The solution recycled from the filters via the heat exchangers and auto oxidation reactor to the leaching tanks contains 8 tons of sulphuric acid which is supplemented with a further 55 tons of strong acid to give an initial concentration in the leach solution of 10 grams per litre of ferric iron and 24 grams per litre of sulphuric acid. During a 5 hour leaching period at 75° C. the ferric concentration drops to 4.3 grams per litre whilst the total iron rises to 13.5 grams per litre due to the dissolution of 8.4 tons of iron from iron containing constituents of the pulp. The leached pulp is filtered and washed on the filter. The filtrate is split into two portions. From one of these, uranium is recovered whilst the other is recirculated for reoxidation and a further leaching cycle. The barren solution from which uranium has been recovered is used for ferric hydroxide recovery by pH adjustment with lime and by air blowing the precipitate in a pachuca vessel at pH 7 or higher in order to convert any ferrous hydroxide into ferric hydroxide for reuse to supplement the oxidised solution recycle.

It will be clear that the basic flow sheet may be varied in many ways for example by two stage leaching with reoxidised solution recycled to each leaching stage. Further, if sufficient $SO_2$ is fed into the auto-oxidation reactor, supplementary supplies of sulphuric acid will be unnecessary. Any iron necessary to supplement that in the recirculated oxidised solution may be obtained from any suitable source.

In general, it is found with the process as described above that uranium extractions are obtainable which are higher than in conventional processes and furthermore that the costs per ton of ore treated are appreciably lower than the corresponding costs in conventional extraction processes.

What we claim as new and desire to secure by Letters Patent is:

1. A method for treatment of uranium ores comprising the continuous dissolution of the uranium from the ore by a single-stage leaching of the latter at a temperature of 50–90° C. with aqueous sulphuric acid containing dissolved ferric sulphate to form a pulp, filtering the pulp, directly recirculating between 35 and 65% of the resulting filtrate to the incoming ore to leach the latter and oxidizing the ferrous sulphate content of said filtrate during said recirculation to form ferric sulphate in solution by stirring said recirculated filtrate at a sufficient rate to form a vortex and flowing air and sulphur dioxide through said vortex to effect auto-oxidation of the ferrous iron content, cooling the pulp to about 40° C. prior to filtration by effecting a heat exchange between the pulp and the recirculated portion of the filtrate, diluting the balance of the filtrate not recirculated to the incoming ore and extracting uranium therefrom.

2. The method according to claim 1 wherein a sufficient excess of sulphur dioxide is passed through said vortex to form sulphuric acid in said recirculated portion of said filtrate by combination with the air and water content of said recirculated portion.

References Cited in the file of this patent

UNITED STATES PATENTS

| 2,306,425 | Bevan | Dec. 29, 1942 |
| 2,736,634 | Gaudin | Feb. 28, 1956 |
| 2,738,253 | Thunaes | Mar. 13, 1956 |

OTHER REFERENCES

Proceedings of the Second United Nations International Conference on the Peaceful Uses of Atomic Energy, Sept. 1–13, 1958, vol. 3, pages 303–317, United Nations, New York.

Clegg: "Uranium Ore Processing," pp. 131–133, 319, 360, 368, September 1958.